June 18, 1935. C. BRACKELSBERG Re. 19,610

PROCESS AND DEVICE FOR THE PRODUCTION OF IRON ALLOYS FREE FROM GASES, ESPECIALLY OXYGEN

Original Filed Feb. 6, 1929

Inventor:

Augusta Brackelsberg
administratrix of the
estate of Carl Brackelsberg
deceased per Dean Fairbank Hirsch & Foster
her attorneys Reissued June 18, 1935 Re. 19,610

UNITED STATES PATENT OFFICE 19,610

PROCESS AND DEVICE FOR THE PRODUCTION OF IRON ALLOYS FREE FROM GASES, ESPECIALLY OXYGEN

Carl Brackelsberg, deceased, late of Milspe, Germany, by Augusta Brackelsberg, administratrix, Milspe, Germany Original No. 1,807,468, dated May 26, 1931, Serial No. 337,747, February 6, 1929. Application for reissue May 22, 1933, Serial No. 672,330. In Germany February 16, 1928

8 Claims. (Cl. 75—45)

It is a known fact that iron alloys (by which term it is meant to include all ferrous metals including common iron and steel) in a molten state, voraciously absorb gases and their absorbing capacity is increased in proportion to the increase in temperature. The molten metal similarly tends to absorb oxides. The gases and oxides absorbed by the liquid iron represent the causes of various failures at the iron and steel foundry, such as high viscosity of the cast metal, as well as blisters, pores and spongy parts in the castings. The latter defects are also caused by gases which are formed by the reaction of the oxides contained in the cast metal with the carbon which is always present therein. The absorption of gases and oxides in the cupola furnace takes place in the melting zone and below the same in which the liquid iron is brought in contact with the furnace gases or the blast air in a finely divided form and in the flame furnace by the direct influence of the flame permanently directed upon the hearth, which forces back the protective layer of slag or comes in contact with the molten metal which bubbles up through the slag layer.

The protective measures heretofore adopted in foundries for the purpose of neutralizing or overcoming the deleterious effects of the absorption of gases and oxides, consisted in adding deoxidation or calming media, in most cases manganese and silicon prior to the casting process. These measures however never proved entirely successful because only certain gases and only a part of these gases were acted upon. There was moreover the danger of retaining the deoxidation products in the liquid steel with consequent increase in the viscosity of the metal. These expedients did not eliminate a considerable number of rejects due to blistered or porous castings or viscid castings. Also the cast iron which had absorbed gases or oxides from the furnace atmosphere during the melting process retained considerable quantities of these impurities in the solution despite the high percentage of silicon, manganese and carbon.

It is therefore obvious that the primary causes of waste or rejected castings in the iron and steel foundries cannot be definitely eliminated by the use of alloying elements. The establishment of this fact points to the task of conducting the melting operation in such a manner that the molten metal is prevented from absorbing gases or oxides in sufficient quantities to cause difficulty.

In accordance with the present invention the desired results are obtained by rapidly melting the charge in a revolvable furnace by means of a coal dust flame and without any accentuated oxidation due to the use of the extraordinarily hot flame and the rotary movement of the furnace, since the molten metal is prevented from absorbing gases by an unbroken protective layer of slag. The oxidation of the charge during rapid melting thereof is but slight due to the fact that the combustion of coal dust does not require any excess of oxygen and after the charge has been melted, the intensity of the flame may be reduced without interfering with the completion of the process.

The inconsiderable quantities of oxide adhering to the charge (scrap iron or pig iron) are expelled therefrom during the melting process and transferred to the slag. The absorption of these oxides in the liquid metal is unlikely on account of the very poor absorbing properties of the metal at a temperature just above the melting point.

The substantial absence of oxides in the molten metal is particularly advantageous where irons rich in carbon are being handled because it eliminates the possibility of any reaction between the carbon and the oxygen which would cause turbulence the bath and bubbling of metal through the layer of slag. An observation of the surface of the bath shows that the reaction of ferrous metals rich in carbon with slag containing a high percentage of metallic oxides, is of a very quiet nature.

The quiet behavior of the bath as well as the use of a coal dust flame which can be tilted upwardly away from the bath, are both contributing factors in protecting the molten metal from the effects of furnace gases and rendering impossible saturation of the metal with gases or oxides. The higher the temperature of the cast metal, the more important does such protection become because it is only during the liquid phase that the absorptive properties of the iron in regard to gases assume higher values, such properties increasing rapidly with further increases in temperature.

The freedom from gas and oxides of ferrous metals melted in accordance with this process is demonstrated by the fact that the molten metal exhibits no indication of gas evolution while being handled with the ladle and that it may be used almost independently of its chemical composition in the manufacture of castings of extremely thin cross sections without rejects due to blisters or pores.

The production of iron free from gas and especially free from oxides is of special importance in connection with malleable iron castings. Heretofore a considerable percentage of the metallic oxides present in the iron became disassociated from the iron upon solidification of the latter, remaining between the crystals in the shape of adhering pellicles. The presence of these pellicles not only weakened the iron but retarded the diffusion of carbon or carbonaceous gases during annealing. The consequence was that the time required for annealing was prolonged and the strength of the iron, particularly its tensile strength was considerably impaired.

The malleable iron casting substantially free of gases and oxides produced in accordance with the present process considerably shortens the time required for annealing and produces castings having double the tensile strength of the castings produced under most favorable circumstances by former processes.

The invention has been represented by way of example in the accompanying drawing in which.

"*a*" is a revoluble furnace capable of rotation about a horizontal longitudinal axis, at one end of which the air and the coal dust feeding device is provided. The air is forced through the vertical tube *h* into the burner *g* at a high rate of speed, while the coal dust is introduced through the horizontal tube *c*, concentric with and terminating in a conventional manner within the burner.

The burner *g* is, in accordance with the invention, capable of being adjusted at different angles with respect to the longitudinal axis of the furnace *a*, with the result that the flame may be turned away from the charge more or less if desired and directed against the upper part of the interior wall of the furnace.

To this end the burner *g* is connected with the air conduit *h* by means of a pliable tube part *i*, while, in the neighborhood of the head *k*, it is provided with two lateral pivots *m*, in two plates *o* disposed laterally of the burner *g*. The plates or flaps *o* are each attached to the upper end of a vertical column *p* and are provided at the ends opposite to the pivots *m* with longitudinal slots *r* disposed radially of said pivot. Said longitudinal slots *r* serve as guide for bolts *s* situated on either side of the burner.

Upon its free end provided with a thread, the bolt *s* carries a nut *u* provided with a handle *t* whereby an adjustment of the bolt *s* may be effected along the slot *r* and in conjunction therewith an adjustment of the burner *g* to any desired angle.

Figure 1:
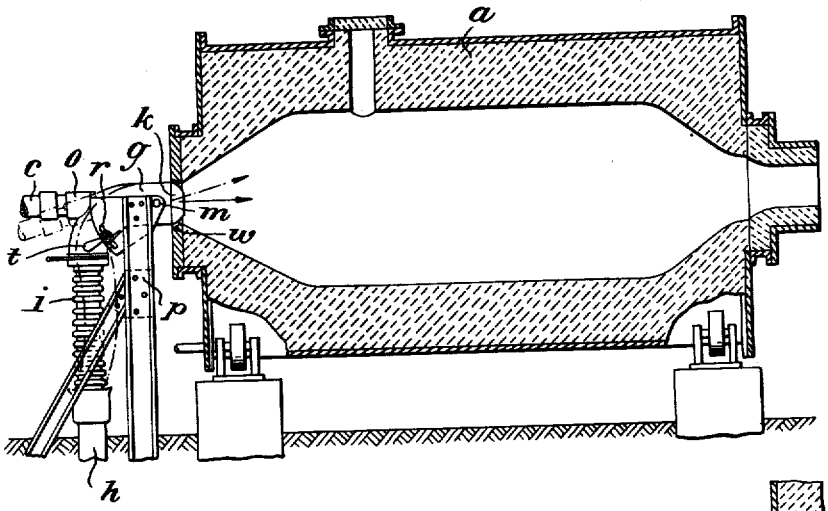
Fig. 1 illustrates the complete melting furnace in vertical longitudinal section with lateral view of the tuyère.
Figure 2:
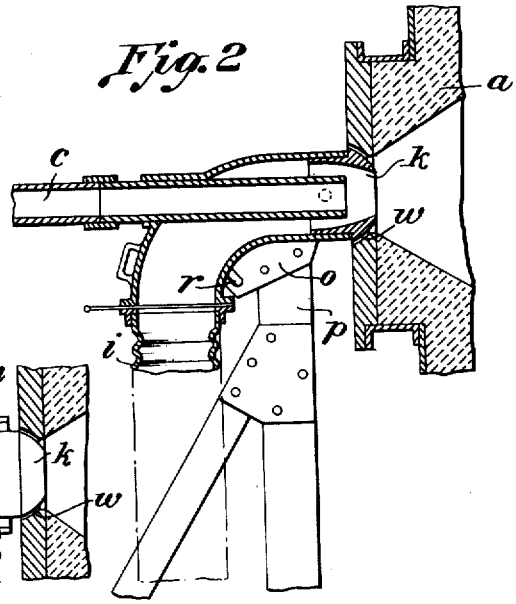
Fig. 2 shows a vertical longitudinal section through the tuyère of the burner with the adjoining part of the revoluble furnace on an enlarged scale.
Figure 3:
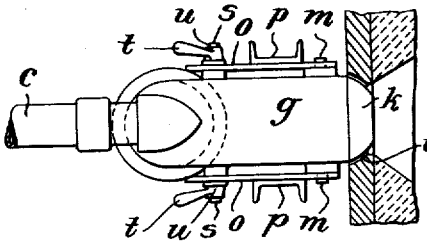
Fig. 3 is a top view of the tuyère on an enlarged scale.

The head *k* of the burner *g* possesses at the forward end a spherical surface and is fitted into a correspondingly shaped aperture *w* of the revoluble furnace *a*, with the result that, as shown in Fig. 1 in dotted lines, said furnace is rendered perfectly tight in any position of the burner *g*. It is, therefore, quite simple to so adjust the furnace flame, that it is more or less turned away from the charge.

It is an essential characteristic of the furnace that the coal dust flame is formed in the furnace proper and so directed that the ashes contained in the flame are for the most part caused to leave the furnace with the gaseous products of combustion. The sulphur contained in the coal escapes from the furnace with the ashes. The carrying out of the process is moreover aided by the very great advantage inherent in coal dust firing, that, in order to insure complete combustion, no appreciable excess of air is required. In consequence thereof flame temperatures may be obtained which approach the theoretical of efficiency, the flame having little tendency to oxidize and nevertheless being sufficiently intense to insure rapid melting.

During the melting down the furnace is made to describe only a few oscillatory movements for the purpose of bringing the coldest parts of the charge in contact with the flame again and again, with the result that the charge is evenly and rapidly heated. The melting down process therefore is of much shorter duration than in a stationary furnace having a flame of the same temperature. Furthermore with the present furnace the heat is more advantageously utilized due to the greater difference in temperature between the flame and that surface of the charge which is turned toward it or upon which the flame impinges.

The acceleration of the melting down process prevents accentuated oxidation of the charge especially if the intensity of the flame is slightly reduced during melting. At the moment of melting down the adhering oxide passes readily into the slag since the tendency of iron to absorb oxides is but slight when the iron is at a temperature just above melting point.

Immediately after the melting down the liquid metal becomes covered with a layer of slag, some lime having been included in the charge for the purpose of aiding the slag formation. During the further progress of the melting process the molten metal is not subjected to the influence of the furnace gases since it is completely covered by a layer of slag. The latter however is comparatively thin, i. e. not so thick that it acts as a heat insulator.

Direct contact of the metal with the flame takes place only during the period of melting down, i. e. at a time when the tendency of the iron to absorb gases is still quite inconsiderable. In a liquid state the tendency of the iron to absorb gases is considerably greater than in a solid state and it increases as the temperature of the liquid iron increases. During that period when the liquid iron is superheated to assume the requisite casting temperature, i. e. the condition in which the iron has the greatest tendency to absorb gases, it is protected from the furnace gases by a layer of slag.

Due to the special conditions prevailing in conjunction with the carrying out of this process, namely the prevention of brisk boiling and the prevention of a violent jet action of the coal dust flame, the layer of slag remains unbroken during superheating of the liquid metal.

Owing to the particular conditions existing as above described, no appreciable quantities of metallic oxides find their way into the bath during melting of the metal and consequently boiling of the bath due to a reaction of carbon with such oxides does not take place to any marked extent. The reaction between the carbon content of the bath and the metallic oxides in the slag progresses very quietly and does not cause any turbulence or bubbling up of metal which would cause further oxidation of the latter.

Although the coal dust flame develops extraordinarily rapidly, it is so conducted that it fairly evenly fills up the free furnace space without however hitting the bath with full force in any one place and thereby moving any localized portion of the layer of slag so that the metal would be exposed. The slag and the furnace walls take up the heat and transfer it to the metal during superheating and the flame does not impinge directly upon the bath.

By the process the iron will scarcely have any opportunity to absorb gas or oxides. Such oxides as may be present in the bath are absorbed by the slag. The resultant molten product is substantially free from gases and absorbed or suspended oxides. The manner in which this melting process differs from the usual processes of melting iron, are worthy of comment.

In conjunction with standard cupola furnace practice it is not possible to prevent the liquid iron which runs down from absorbing gases and oxides from the atmosphere of the furnace and oxides are transferred to the iron bath in fine distribution. By such process the danger of obtaining an iron rich in gases and oxides is very great. In the fixed flame or stationary "air furnace" practice, melting down requires a very considerable time owing to the unfavorable conditions for transferring heat to those portions of the charge which do not happen to be on the surface, with the result that before the iron is melted it may possibly become saturated with gases from the atmosphere of the furnace. With such furnace in order to best utilize the heat for melting and also in order to prevent rapid destruction of the top of the furnace, the flame must be pointed to the bath so that direct contact of the flame with the exposed metal cannot be avoided. The most highly heated part of the charge acquires an enhanced capacity to absorb gases which are transferred directly to it by the flame. Such a condition is especially accentuated in an oil furnace in which a comparatively small jet of flame impinges sharply upon the bath. Only while using an electrofurnace has it heretofore been possible to produce a good quality of cast iron but such a process has proven too expensive for melting purposes.

By means of the process, iron alloys may be melted at a lower cost than has heretofore been possible and these iron alloys are distinguished by particularly high grade quality.

Having thus described the invention, what is claimed as new and desired to secure by Letters Patent of the United States is:—

1. The process for the production of ferrous metals substantially free from gases and oxygen, which consists in melting a charge of metal in a rotary furnace by means of the direct heat of the combustion gases from coal dust applied directly on the charge and after the surface of the metal has become covered with a thin unbroken layer of slag, continuing the heating of the liquid metal by transmission of heat thereto through the walls of the furnace while the thin interposed layer of slag protects the metal from direct contact with the furnace gases.

2. A process for the production of iron alloys substantially free from gases and oxygen, which consists in melting the charge by a coal dust flame applied directly on the charge in a rotary furnace, whereby the charge becomes covered with a thin unbroken layer of slag and continuing the treatment of the metal at a higher temperature while the metal is protected from the direct heat of the flame by the slag layer and heat is also transferred to the metal through the lining of the rotating furnace.

3. A process for the production of iron alloys substantially free from gases and oxygen, which consists in first subjecting the charge in a rotary furnace while oscillating the furnace to the heat of a coal dust flame applied directly on the charge until the charge is melted and a thin unbroken layer of slag formed thereon, then rotating the furnace and continuing the treatment of the metal at a higher temperature while concentrating a major portion of the heat of the combustion on the furnace lining from which it is transmitted to the metal while the metal is protected from contact with the combustion gases by the slag layer.

4. A process for the production of iron alloys substantially free from gases and oxygen which consists in placing a charge of iron in a rotary furnace, oscillating the furnace and subjecting the charge to the heat of the gases of combustion from coal dust applied directly on the charge until the charge is melted and a thin unbroken layer of slag formed, then rotating the furnace and concentrating the major portion of the heat of the combustion gases against the furnace walls whereby the heat will be transmitted through such walls to the metal during rotation of the furnace while the slag layer protects the metal from direct contact with the combustion gases and prevents the absorption of gases by the metal.

5. A process for the production of iron substantially free from gases and oxygen which consists in subjecting the charge in a rotary furnace to the heat of a coal dust flame applied directly on the charge until the charge is substantially melted and a protective layer of slag formed thereon, then rotating the furnace and continuing the treatment of the metal at a higher temperature while concentrating a major portion of the heat of combustion on the furnace lining while the metal is protected from contact with the combustion gases by the slag layer.

6. A process for producing ferrous metals substantially free from gases which consists in melting a charge of metal in a rotary furnace by means of the heat of the combustion gases from coal dust applied directly on the charge and after the surface of the metal has become covered with a protective layer of slag, continuing the heating of the liquid metal by transmission of heat thereto through the walls of the furnace while the slag layer substantially protects the metal from direct contact with the furnace gases.

7. A process for the production of iron alloys substantially free from gases and oxygen which consists in first directing a coal dust flame directly upon the charge in a rotary furnace while oscillating the furnace until the charge is melted, and a thin layer of slag formed thereon, then tilting the flame upwardly slightly while rotating the furnace so that treatment of the metal at a higher temperature is continued while the major portion of the heat of combustion is concentrated on the furnace walls from which it is transmitted to the metal while the metal is protected from contact with the combustion gases by the slag layer.

8. A process for the production of iron substantially free from gases and oxygen which consists in directing a coal dust flame directly against the charge in a rotary furnace until the charge has substantially melted, and a protective layer of slag formed thereon, then tilting the flame upwardly to concentrate it for the most part on the walls of the furnace and rotating the furnace, whereby treatment of the metal at a higher temperature is continuous without agitation of the slag layer by the flame and without contact between the molten metal and the products of combustion.

AUGUSTA BRACKELSBERG,
*Administratrix of the Estate of Carl Brackelsberg, Deceased.*